US010587461B2

(12) United States Patent
Robertson et al.

(10) Patent No.: US 10,587,461 B2
(45) Date of Patent: *Mar. 10, 2020

(54) INCREMENTALLY MANAGING DISTRIBUTED CONFIGURATION DATA

(71) Applicant: MICROSOFT TECHNOLOGY LICENSING, LLC, Redmond, WA (US)

(72) Inventors: James G. Robertson, Issaquah, WA (US); Jeffrey P. Snover, Woodinville, WA (US); Sameer S. Mutatkar, Sammamish, WA (US); Rahim Maknojia, Bellevue, WA (US); Liu Hong, Bothell, WA (US); Bruce G. Payette, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 54 days.

This patent is subject to a terminal disclaimer.

(21) Appl. No.: 15/678,460

(22) Filed: Aug. 16, 2017

(65) Prior Publication Data

US 2017/0346681 A1    Nov. 30, 2017

Related U.S. Application Data

(63) Continuation of application No. 14/089,699, filed on Nov. 25, 2013, now Pat. No. 9,755,890, which is a
(Continued)

(51) Int. Cl.
*H04L 12/24* (2006.01)
*G06F 9/445* (2018.01)
(Continued)

(52) U.S. Cl.
CPC .......... *H04L 41/08* (2013.01); *G06F 9/44505* (2013.01); *G06F 15/177* (2013.01); *H04L 43/00* (2013.01); *G06F 16/252* (2019.01)

(58) Field of Classification Search
CPC ....... H04L 41/08; H04L 41/12; H04L 41/069; H04L 41/0853; H04L 41/0893;
(Continued)

(56) References Cited

U.S. PATENT DOCUMENTS 7,103,874 B2 * 9/2006 McCollum ................ G06F 8/36
709/220
7,239,629 B1 * 7/2007 Olshansky .......... H04Q 3/0045
370/353
(Continued)

OTHER PUBLICATIONS

Woodman, S., 2008. A programming system for process coordination in virtual organisations. (Year: 2008).*
(Continued)

*Primary Examiner* — James N Fiorillo
(74) *Attorney, Agent, or Firm* — Workman Nydegger

(57) ABSTRACT

A configuration management system provides a partitioned data model for collecting and representing configuration information from a diverse set of sources to allow easier modeling of very large, highly redundant sets of enterprise configuration information. The system partitions large configuration schema into logical subcomponents that can be combined, shared, and reused. The system also partitions instantiated data models into logical sub-models that can be combined, shared, reused, and incrementally updated. Each product team can provide its own configuration schema, which allows the domain experts in a particular field to provide reusable models for their products. These models may include sub-models that allow reuse of selected portions of the configuration schema. When the system stores data related to each portion of the model, it stores the data in a partitioned manner that makes incremental updates of each component of the model more straightforward and less resource intensive.

19 Claims, 4 Drawing Sheets

Related U.S. Application Data continuation of application No. 12/716,290, filed on Mar. 3, 2010, now Pat. No. 8,595,334.

(60) Provisional application No. 61/306,912, filed on Feb. 22, 2010.

(51) Int. Cl.
*G06F 15/177* (2006.01)
*H04L 12/26* (2006.01)
*G06F 16/25* (2019.01)

(58) Field of Classification Search
CPC .......... G06F 9/46; G06F 9/451; G06F 9/4401; G06F 9/5027; G06F 9/44505
USPC ............ 709/208, 220; 707/610, 754, 999.01, 707/E17, 694
See application file for complete search history.

(56) References Cited

U.S. PATENT DOCUMENTS

| | | | |
|---|---|---|---|
| 7,395,322 B2 | 7/2008 | Harvery et al. | |
| 7,653,008 B2 | 1/2010 | Patrick et al. | |
| 7,882,057 B1 | 2/2011 | Little et al. | |
| 8,321,549 B2* | 11/2012 | Isobe | G06F 8/71 707/723 |
| 8,386,757 B1 | 2/2013 | Midgley | G06F 9/4401 713/1 |
| 8,595,334 B2* | 11/2013 | Robertson | G06F 9/44505 709/220 |
| 8,832,675 B1 | 9/2014 | Abderrazzaq | G06F 9/44505 717/169 |
| 2003/0204789 A1* | 10/2003 | Peebles | G06F 11/0715 714/47.2 |
| 2005/0091346 A1* | 4/2005 | Krishnaswami | G06F 9/44505 709/220 |
| 2006/0025962 A1* | 2/2006 | Ma | G06Q 10/10 702/182 |
| 2006/0101375 A1 | 5/2006 | Loughlin et al. | |
| 2006/0101442 A1* | 5/2006 | Baumgart | G06F 8/38 717/162 |
| 2006/0129652 A1* | 6/2006 | Petrovskaya | G06F 9/46 709/208 |
| 2006/0218164 A1* | 9/2006 | Shinmura | G06F 16/93 |
| 2006/0280207 A1* | 12/2006 | Guarini | H04L 41/0853 370/524 |
| 2007/0005662 A1* | 1/2007 | Bankston | G06F 16/27 |
| 2007/0061125 A1* | 3/2007 | Bhatt | G06F 21/577 703/20 |
| 2008/0051921 A1* | 2/2008 | Nammatsu | G06Q 10/06 700/97 |
| 2009/0063501 A1* | 3/2009 | Buckler | G06F 11/2025 |
| 2009/0187595 A1* | 7/2009 | Akiyama | G06F 16/288 |
| 2010/0057677 A1* | 3/2010 | Rapp | G06F 11/0709 707/E17.014 |
| 2010/0057780 A1* | 3/2010 | Isobe | G06F 8/71 707/E17.045 |
| 2010/0087188 A1* | 4/2010 | Griff | H04L 41/12 455/424 |
| 2010/0115490 A1* | 5/2010 | Wilcock | G06F 8/10 717/104 |
| 2010/0153149 A1* | 6/2010 | Prigge | G06Q 10/06 705/7.11 |
| 2010/0204970 A1* | 8/2010 | Loomans | G06Q 30/0603 703/6 |
| 2010/0280863 A1* | 11/2010 | Wilcock | G06Q 10/00 705/7.11 |
| 2011/0004564 A1* | 1/2011 | Rolia | G06Q 10/06 705/348 |
| 2011/0022978 A1* | 1/2011 | Keller | G06F 9/451 715/771 |
| 2011/0126197 A1 | 5/2011 | Larsen et al. | |
| 2011/0153624 A1* | 6/2011 | Aigner | G06F 16/252 707/754 |
| 2012/0324069 A1* | 12/2012 | Nori | G06F 9/5066 709/222 |
| 2013/0124465 A1* | 5/2013 | Pingel | G06F 3/0604 707/610 |
| 2015/0149602 A1 | 5/2015 | Robertson et al. | |

OTHER PUBLICATIONS

Kim KH, Ellis CA. Performance analytic models and analyses for workflow architectures. Information Systems Frontiers. Sep. 1, 2001;3(3):339-55. (Year: 2001).*

Office Action issued in U.S. Appl. No. 12/716,290 dated Feb. 19, 2013.

Notice of Allowance issued in U.S. Appl. No. 12/716,290 dated Jul. 19, 2013.

International Search Report and Written Opinion issued in PCT/US2011/024924 dated Sep. 20, 2011.

Office Action issued in U.S. Appl. No. 14/089,699 dated Sep. 25, 2015.

Office Action issued in U.S. Appl. No. 14/089,699 dated Apr. 14, 2016.

Notice of Allowance issued in U.S. Appl. No. 14/089,699 dated May 4, 2017.

* cited by examiner

INCREMENTALLY MANAGING DISTRIBUTED CONFIGURATION DATA

CROSS-REFERENCE TO RELATED APPLICATIONS

This application is a continuation of U.S. patent application Ser. No. 14/089,699 filed on Nov. 25, 2013, entitled "Incrementally Managing Distributed Configuration Data," which issued as U.S. Pat. No. 9,755,890 on Sep. 5, 2017, which is a continuation of U.S. patent application Ser. No. 12/716,290 filed on Mar. 3, 2010, entitled "Incrementally Managing Distributed Configuration Data," which issued as U.S. Pat. No. 8,595,334 on Nov. 26, 2013, which claims the benefit of and priority to U.S. Provisional Patent Application Ser. No. 61/306,912 filed on Feb. 22, 2010, and entitled "Incrementally Updating Distributed Configuration Data," wherein all of the foregoing are incorporated herein by reference in their entireties.

BACKGROUND OF THE INVENTION

Many organizations and systems include server computer systems that provide various useful functions to the organization. For example, even a small business may have an email server, one or more database servers, a company intranet portal hosted by a web server, a file server, and so forth. These functions may reside on a single computer system or on several computer systems, such as to increase scalability and provide adequate resources for each function based on anticipated or measured loads. Products, such as Microsoft Windows Small Business Server provide multiple server functions in a single product.

Each of these servers and functions include configuration data that is managed by one or more administrators. For example, a firewall server includes configuration data describing open ports, protocols allowed through the ports, time of day limitations, and so forth. As the number of servers and server functions increases, it can become difficult for administrators to manage the configuration data. Tools such as MICROSOFT™ Baseline Configuration Analyzer (MBCA) provide automated ways for administrators to collect and analyze configuration data from the many servers in an enterprise. Examples of configuration data analyzed include registry values, configuration stored in the file system, port numbers, certificate expiration dates, product versions, and so forth.

Even with such tools, configuration modeling in an enterprise computing environment involves reasoning across enormous amounts of data. This data is gathered by interrogating hundreds or thousands of nodes in the enterprise computing infrastructure. The size of the data and the amount of time needed to create instances of a data model prohibits the use of traditional modeling techniques. In addition, models tend to have a high degree of redundancy in their component elements, making the expression of the model unnecessarily complex. As the size of the organization grows and the number of servers increases, the problem only becomes worse. Configuration problems also multiply. For example, a farm of 10 email servers may include a single server that is not configured like the others due to a misconfiguration, and the amount of searching that an administrator performs to identify such problems grows as the size of the organization increases. This is often contrary to the organization's expectations as the organization's users are less tolerant of reliability problems in a large enterprise than a small business.

BRIEF SUMMARY

A configuration management system is described herein that provides a partitioned data model for collecting and representing configuration information from a diverse set of sources to allow easier modeling of very large, highly redundant sets of enterprise configuration information. The system partitions large configuration schema into logical subcomponents that can be combined, shared, and reused. The system also partitions instantiated data models into logical sub-models that can be combined, shared, reused, and incrementally updated. The configuration management system described herein provides a hierarchical configuration schema that enhances configuration data collection. Initially, the embodiments generate a main configuration data model for a system. This main data model describes what configuration information to collect from the system and how to format that information for storage and analysis. The embodiments also partition the main configuration data model into one or more logical sub-models. The sub-models are included in a hierarchy beneath the main configuration data model. Further, each of these sub-models describes how to collect a sub-portion of the configuration information. As a result, a combination of all of the sub-models describes how to collect all of the configuration information. The embodiments then use these sub-models to collect the configuration information from the system. Thereafter, the embodiments compare the collected configuration information to a recommended configuration setting to identify whether any differences exist between the collected configuration information and the recommended configuration setting. Thus, the configuration management system provides easier to manage and more efficient collection of configuration data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
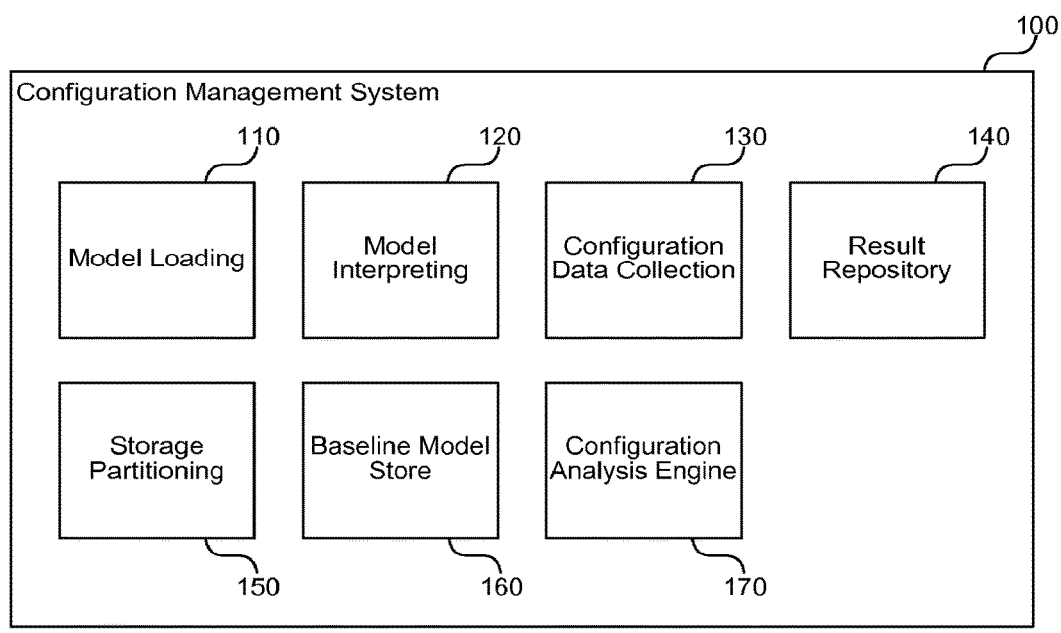
FIG. 1 is a block diagram that illustrates components of the configuration management system, in one embodiment.

A configuration management system is described herein that provides a partitioned data model for collecting and representing configuration information from a diverse set of sources to allow easier modeling of very large, highly redundant sets of enterprise configuration information. The system partitions large configuration schema into logical subcomponents that can be combined, shared, and reused. The system also partitions instantiated data models into logical sub-models that can be combined, shared, reused, and incrementally updated. An example of a configuration schema is one representing configuration information for a MICROSFT™ Dynamics application. Dynamics may rely upon information stored in MICROSOFT™ SQL Server (SQL) as well as information stored in MICROSOFT™ Team Foundation Server (TFS). Such an application may include configuration data specific to each of Dynamics, SQL, and TFS. In traditional configuration collection systems, a monolithic schema describes all of the configuration information for each component involved in delivering a particular application solution.

The configuration management system described herein provides a hierarchical configuration schema that enhances configuration data collection. First, each product and product team can provide its own configuration schema. For example, SQL can provide a SQL configuration schema, TFS can provide a TFS configuration schema, and so forth. This allows the domain experts in a particular field to provide models for their products that are applicable to a wide variety of applications. In addition, these models may include sub-models, such as a sub-model describing backend configuration data and another sub-model describing frontend configuration data. Returning to the example of a MICROSOFT™ Dynamics application, if the application uses a TFS front end and a SQL backend, the system can build a logical aggregate model that includes a custom portion for the specific application, a reused common SQL backend sub-model, and a reused common TFS frontend sub-model. In addition, when the system stores data related to each portion of the model, it stores the data in a partitioned manner described further herein that makes incremental updates of each component of the model more straightforward and less resource intensive. Thus, the configuration management system provides easier to manage and more efficient collection of configuration data.

The configuration information in enterprise systems can be substantial in size. For example, it may consume hundreds of megabytes (MB) or even gigabytes (GB) of memory to store configuration information. Collecting this data can also be extremely time consuming due to network latency, processing time, and so forth. Collecting and storing this data only represents one piece of the problem—after the data is stored it is typically analyzed and reasoned across. When the data sets are extremely large, operating upon the data in memory becomes impossible or extremely difficult. Another problem that arises when creating models for enterprise configuration data is that of reusing model schema or instance data. There is a great deal of redundancy between components in an enterprise system, and so ways to reuse the schema or instance data is helpful. Traditional approaches address this problem by creating fragments of model schema and then combining them into a single huge document to represent larger systems that are analyzed as a whole. However, this approach does not scale well, as eventually the size of the combined fragments becomes cumbersome. Manipulation of the data is slow or runs into memory problems.

The configuration management system takes a different approach. A configuration model schema that represents a system is partitioned into logical subcomponents. When a configuration model schema is partitioned, the different pieces represent smaller subcomponents of the larger system allowing analysis to be performed in a staged way and then the results aggregated instead of the raw data. As the results are often orders of magnitude smaller, this allows scaling to address much larger problems. Manipulation of the different subcomponents to create new models becomes possible. For example, two subcomponents may be combined to create a logical model. These same subcomponents may also be shared with different subcomponents to create a new logical model. As enterprise systems have a great deal of redundancy, this allows the size of the data to be kept manageable.

The system allows for great flexibility when the model schemas are instantiated. As with the schema, the instantiated data models may be partitioned as smaller sub-models. This allows them to be aggregated to generate the original model or combined with other instantiated sub-models to generate new models. Reasoning across the partitioned sub-models consumes less memory, as only the pertinent sub-models need be loaded.

In addition, updating the instantiated configuration data is easier using the configuration management system. An analysis may find issues that need to be addressed. For example, the analysis may discover an erroneous configuration setting that is then addressed manually by an administrator or automatically by the system. After they are addressed, it is undesirable to update the entire set of collected configuration data, as this may be a time-consuming and memory-inefficient process. The configuration management system can update a subset of the data, such as only the sub-model affected by the configuration change. As the configuration data has been partitioned, only the changed partition needs to be updated. Once updated, analysis can be repeated across the complete data set.

The partitioning of the scheme performed by the system also allows a higher degree of parallelism and concurrency. Previous systems stored collected configuration data from multiple sources in a single file, such as an extensible markup language (XML) file. This meant that collection of configuration data was bottlenecked around this file and concurrency issues relating to use of the file had to be managed. The partitioning of stored data performed by the configuration management system described herein partitions collected data by sub-model and by machine. This allows separate threads or processes to be directed to collect data for each sub-model and each machine instance of a sub-model, so that collection and updates can occur in a highly parallel fashion, limited only by the collecting machine or machines available resources.

Configuration data models describe what configuration information to collect from a source and how to represent the configuration information for storage and analysis. In some embodiments, the data models have the following high-level structure:

1) Each data model is stored in a separate location (e.g., a folder) within the model repository. The data model describes how to collect configuration information from a particular source and how to format the information for storage. The model may also describe any constraints (i.e. rules) applied across the data in the analysis stage. The data model may contain, for example, parameters to affect how data is collected or analyzed.

2) Each data model is composed of zero or more sub-models in a hierarchy beneath the main model. Like the main model, the sub-models describe how to collect configuration information.

3) Each data model or sub-model can be executed on a target machine. A data model may also invoke the model's own sub-models or the sub-models of additional models.

When a model or sub-model is invoked, the system writes the collected configuration information and analysis into a result repository. In some embodiments, the result repository has the following structure:

1) Hierarchical arrangement of configuration data, keyed by model, sub-model, source machine, context in which the model/sub-model ran, and execution parameters. For example, in a repository that is based upon a file system, the result repository could be structured with a root level, then a subfolder for the main model, then a sub-folder (recursively) for each sub-model, then a subfolder for each machine, and so forth. In each folder, an XML or other data file stores the collected configuration information, and the same or a separate XML file stores analysis results. The execution context enables configuration data collected by different runs of a single sub-model to be used in different aggregate models. For example, model A and model B may both be composed of configuration data described by sub-model B1; thus, the repository will use the execution context to indicate which model triggered the sub-model's execution (e.g., by storing collected data in an appropriate subfolder of the repository based on the execution context).

2) When a data model is executed, the configuration data and analysis data are used to populate the appropriate slot for that run. The system may store the raw configuration data separately from any analysis performed upon the gathered data. This allows different analyses to be independently run on the same collected data, as well as updating of collected data and separation from the analysis of that data.

3) The root location of the repository can be local or on a network to facilitate sharing the repository.

4) Results may be associated with a context. A sub-model may be invoked by any number of models because those models depend on the configuration data collected by that sub-model (e.g., a SQL backend sub-model). The data collected in one context may not be applicable in another. For example, perhaps model A references the data generated by sub-model B, but sub-model B invoked with different parameters is referenced by model C. The repository uses a model invocation context as an additional key in the result repository. Thus, the results for a sub-model executed as part of the runs of two different models will be stored in two different locations.

Below is one possible implementation showing the result repository hierarchy for a file-system based repository:

```
$reportRoot\<model1>Results\<model1>\configuration.xml
$reportRoot\<model1>Results\<model1>\analysis.xml
$reportRoot\<model1>Results\<model1>\<submodel1>\
   <server1>\configuration.xml
$reportRoot\<model1>Results\<model1>\<submodel1>\
   <server1>\analysis.xml
$reportRoot\<model1>Results\<model2>\<submodel2>\
   <server2>\configuration.xml
$reportRoot\<model1>Results\<model2>\<submodel2>\
   <server2>\analysis.xml
```

FIG. 1 is a block diagram that illustrates components of the configuration management system, in one embodiment. The system 100 includes a model loading component 110, a model interpreting component 120, a configuration data collection component 130, a result repository 140, a storage partitioning component 150, a baseline model store 160, and a configuration analysis engine. Each of these components is described in further detail herein.

The model loading component 110 loads a stored model that describes one or more configuration settings. The model may include one or more sub-models or references to separately stored sub-models. The configuration settings can include any many types of configuration data, such as registry settings, initialization file settings, database settings, web server metabase settings, and so forth. The model loading component 110 loads the stored model and provides it to the model interpreting component 120 for interpretation.

The model interpreting component 120 identifies elements of the loaded model that relate to data collection. For example, the component 120 may identify a hierarchical series of sub-models, data for each of which can be gathered by the system 100 in parallel. The model interpreting component 120 may receive an instance identifier that will be associated with data collected in a present instantiation of the loaded model. For example, an administrator may invoke a command-line tool that specifies a particular stored model, destination repository location, instance identifier, and one or more elements of the model to be run. The system 100 uses this information to execute (i.e., collect data related to) the model and store collected data in the specified repository.

The configuration data collection component 130 gathers data associated with one or more identified elements of the loaded model. The configuration data collection component 130 may manage multiple parallel execution units (e.g., a thread pool, invoking child processes, or other parallel execution paradigm) that each handle one or more elements of the loaded model. For example, for a model that includes a SQL sub-model and a MICROSOFT™ Internet Information Server (IIS) sub-model, the data collection component 130 may gather data for each sub-model in parallel and store the results in the result repository 140 as they are received. The configuration data collection component 130 also includes logic for updating changed elements of the loaded model without re-retrieving data for the entire loaded model, referred to as incrementally updating the gathered data.

The result repository 140 stores resulting configuration data from gathering data associated with the loaded model. The result repository 140 may also store resulting analysis data from analyzing gathered data. The result repository 140 may include a file system, database, storage area network (SAN), cloud-based storage server, or any other storage solution for storing data. The result repository 140 is partitioned in a manner that allows parallel data collection processes to write results to the repository 140 at the same time and without overwriting or interfering with each other.

The storage partitioning component 150 manages partitioning of the result repository 140 to allow logical separation of configuration data. The data collection component 130 may invoke the storage partitioning component 150 to determine a path within the result repository 140 where received configuration data will be stored. The storage partitioning component 150 enables reuse of gathered configuration data across data models by selecting a storage format that allows identification and separation of data related to a particular sub-model. The storage partitioning component 150 also enables concurrency to improve execution time of data gathering. The storage partitioning component 150 may receive context information from an administrator that the component 150 uses to modify or contribute to the partitioning scheme. For example an administrator may specify an execution context that the storage partitioning component 150 adds to a path associated with configuration data for a particular run of the system 100.

In some embodiments, the system performs comparison of configuration data to a baseline configuration model. The following two components are used for analyzing configuration data and determining deviations from a baseline configuration model. In some cases, configuration data collection may be performed by a different entity than configuration analysis. In such cases, the system may package collected configuration data and transmit it to a third party. For example, an organization using a product may collect configuration data related to the organization's computing environment and send the collected data to a product support services group to analyze the configuration (e.g., to diagnose errors).

The baseline model store 160 stores a declarative representation of recommended configuration settings for one or more server functions. For example, the baseline model store 160 may include an XML file for a particular server application that contains a hierarchical representation of configuration settings recommended for the server application. The baseline model store 160 may be partitioned similar to the models described above, where baseline models exist for sub-models. For example, a particular application may reference a baseline sub-model related to MICROSOFT™ Exchange configuration settings, a baseline sub-model related to SQL configuration settings, and so forth.

The configuration analysis engine 170 compares gathered configuration data to the declarative representation of recommended configuration settings to identify differences between the two. The configuration analysis engine 170 may include a reporting sub-component and user interface for displaying differences to an administrator so that the administrator can investigate the differences and perform manual remediation as needed. In addition, the system 100 may include automated remediation as well as assisted remediation, such as prompts in the user interface that allow an administrator to select a fix for a particular configuration difference and to instruct the system 100 to apply the fix.

The computing device on which the configuration management system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
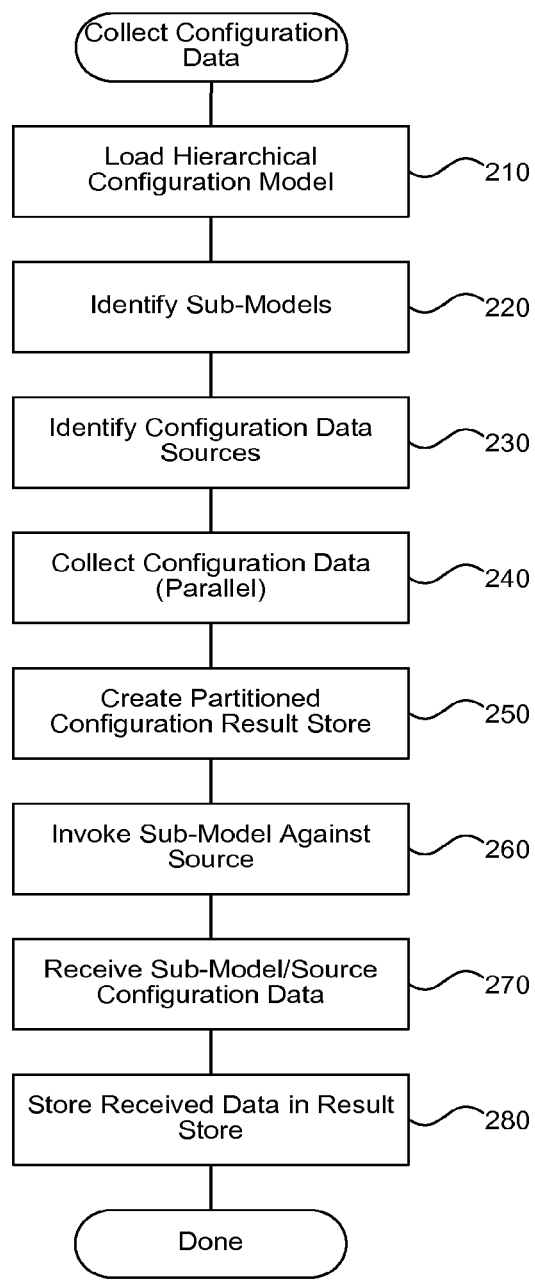
FIG. 2 is a flow diagram that illustrates processing of the data collection component of the configuration management system to collect configuration data from one or more sources, in one embodiment.

FIG. 2 is a flow diagram that illustrates processing of the data collection component of the configuration management system to collect configuration data from one or more sources, in one embodiment. Beginning in block 210, the component loads a hierarchical configuration model that includes information about how configuration data for one or more software applications is stored at distributed computer systems. For example, the model might describe SQL configuration parameters and where they are located on a target computer system.

Continuing in block 220, the component identifies one or more sub-models associated with the loaded configuration model. For example, the loaded configuration model may include references to one or more sub-models that describe configuration data for one or more software applications or application components. The configuration model may be stored in a hierarchical format, where sub-models are children of the configuration model or other sub-models. A sub-model may include a script to run to collect data for the model (e.g., a Power Shell script), an XML Schema Definition (XSD) or other instructions for validating collected configuration data, one or more schema rules, and so forth. Continuing in block 230 the component identifies one or more sources of configuration data in a target network. For example, an administrator may provide a list of servers in an organization that the component receives, or the system may automatically identify servers or other sources of configuration data automatically (e.g., by broadcasting a request).

Continuing in block 240, the component begins a parallel process of collecting configuration data from multiple identified sub-models and/or identified sources at the same time. The system may determine an amount of work to perform concurrently by querying the available resources of a computer system executing the configuration management system. Because of the manner in which result data is partitioned by the system, the system can collect one source of information at a time, all sources of information at a time, or anywhere in between. The following blocks describe steps that may be happening in parallel against many sources and sub-models concurrently.

Continuing in block 250, the system creates a partitioned configuration result store for a selected sub-model and source. For example, the system may create a folder associated with the selected sub-model and source and create an XML or other data file within that folder. Because each concurrent data collection process creates its own result store, concurrent processes do not overlap or interfere with each other's data. Although not shown, the component may also include context information specified when the component was invoked in a location selected for storing the result. For example, the system may append a context identifier to a file path at which the result store is located.

Continuing in block 260, the component invokes the selected sub-model against the selected source. For example, if an organization has 10 Exchange servers, then the system may invoke a sub-model related to exchange server configuration data on one of the 10 servers. The sub-model includes a script or other instructions that specify what data to collect and how that data is stored in a result repository once collected. Continuing in block 270, the component receives at a repository server configuration data from the selected sub-model and source based upon requests defined within the selected sub-model. For example, the component may collect configuration data to a central server, and each sub-model defines what information to send to the central server. A command line specified to initiate the collection process may define a location (e.g., a DNS name or IP address) of the repository server, one or more sub-models to invoke, and one or more sources against which to invoke the sub-models.

Continuing in block 280, the component stores the received configuration data in the created partitioned configuration result store for the selected sub-model and source. For example, the component may populate and save an XML file with the data resulting from invoking a script associated with the invoked sub-model. If the component is executing multiple collection processes concurrently, then the component waits for all of the processes to complete, and may generate a report (not shown) to present the results of the data collection process to an administrator. After block 280, these steps conclude.

Figure 3:
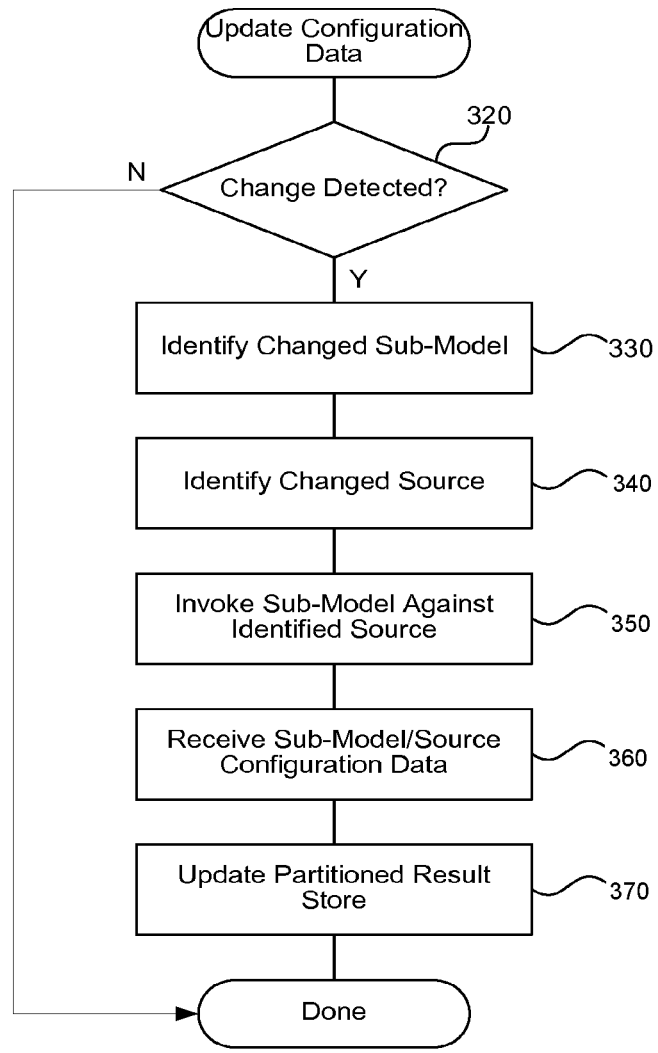
FIG. 3 is a flow diagram that illustrates processing of the data collection component of the configuration management system to incrementally update collected configuration data, in one embodiment.

FIG. 3 is a flow diagram that illustrates processing of the data collection component of the configuration management system to incrementally update collected configuration data, in one embodiment. Beginning in block 310, the component determines whether any configuration data has changed. For example, the component may receive an indication that an administrator has manually remediated a configuration error detected during a prior data analysis process. Alternatively or additionally, the system may automatically remediate configuration errors and may indicate that configuration data has changed after automatically correcting an error. If the configuration has changed, then the component continues at block 320, else the component completes.

Continuing in block 320, the component identifies a sub-model associated with the changed configuration data. For example, the system may receive an indication of what type of data changed as a command line parameter to a command line tool for collecting and analyzing configuration data. Continuing in block 330, the component identifies a source of configuration data associated with the changed configuration data. For example, if the remediation of the configuration error applied to a particular server in an organization, then the system may identify the particular server as a changed source. Alternatively or additionally, an administrator may indicate to the system which servers potentially have configuration data that has changed.

Continuing in block 340, the component invokes the identified sub-model against the identified configuration data source. Because the configuration management system partitions configuration data by sub-model and source (and sometimes by other information such as execution context), the system can update configuration data related only to those sources that have changed or that have potentially changed without invalidating (and therefore having to update) the entire result repository. Continuing in block 350, the component receives updated configuration data as a result of invoking the identified sub-model against the identified configuration data source. The system may perform multiple similar updates concurrently for different sub-models and/or sources of data. The combination of partitioning result data to allow for incremental updates and concurrent gathering of data can, for example, reduce data updates from several hours to several minutes.

Continuing in block 360, the component updates a result store partitioned at least by sub-model and configuration data source with received, updated configuration data. A particular slot or partition of the result store may include an XML file or other hierarchical unit of configuration data that the system can replace or update with new configuration data without affecting configuration data stored for other sub-models and sources. In addition, the system may separately store configuration data analysis results so that gathered configuration data can be updated without invalidating results from a prior analysis process. Later, an administrator may re-run the analysis process to update the analysis results based on the new configuration data. Even this analysis process can operate in an incremental manner based on the data partitioning, so that only those partitions with new configuration data are re-analyzed to produce new analysis results. This greatly reduces the time spent on analysis subsequent to the first analysis. After block 360, these steps conclude.

Figure 4:
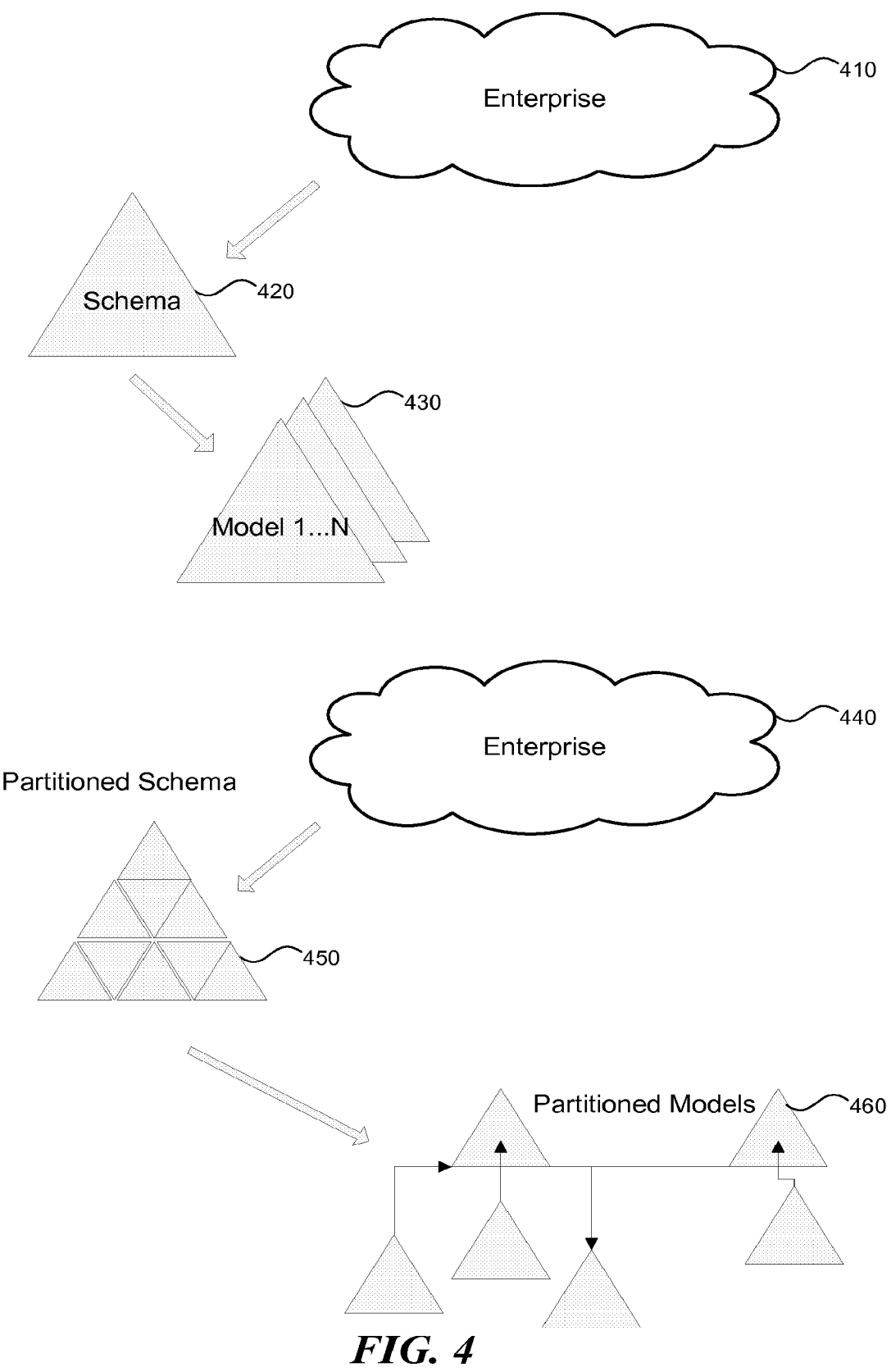
FIG. 4 is a block diagram that illustrates a conceptual representation of the partitioned data collection model of the configuration management system, in one embodiment.

FIG. 4 is a block diagram that illustrates a conceptual representation of the partitioned data collection model of the configuration management system, in one embodiment. The upper portion of the diagram illustrates typical configuration data systems today, and the lower portion illustrates the configuration management system described herein. In typical systems, an enterprise 410 defines a monolithic schema 420 that includes all of the configuration information that the enterprise 410 considers relevant for analysis. The enterprise 410 may develop multiple monolithic models 430, but each model is self-contained and analysis is performed against a single model. Information cannot be shared or reused between models.

A second enterprise 440 using the configuration management system defines a partitioned schema 450. The partitioned schema 450 includes configuration data related to specific applications, products, or server functions that is combined together to create partitioned models 460 in a manner appropriate for any particular analysis. Schema may be reused across applications, products, and server functions in any way that is useful to the enterprise 440 for a particular analysis. For example, sub-models from a particular model may be used many times in many different models to collect configuration information related to a portion of a particular analysis to be run.

In some embodiments, the configuration management system, receives update frequency information from a sub-model. For example, a sub-model may include metadata that indicates that the sub-model need not be updated more frequently than once per day. The sub-model author understands the nature of the configuration data collected by the sub-model and may know that configuration settings related to the sub-model do not change frequently (or change very frequently). Thus, the sub-model author may include information that provides a hint to the incremental update portion of the system to know how often to gather updated configuration information for that sub-model.

In some embodiments, the configuration management system includes a command-line interface (CLI) for performing the processes described herein. For example, the system may include a Power Shell module (e.g., cmdlets) that can be invoked by an administrator to collect initial configuration data, perform incremental updates of configuration data, perform an analysis of collected configuration data, remediate configuration errors, and so forth. For example, the command line "scan SQL-FE-CN Machine1" may indicate that the system should invoke a SQL frontend sub-model for a configuration source Machine1.

In some embodiments, the configuration management system validates gathered configuration data using sub-model validation rules. For example, for configuration data stored in an XML file, the sub-model may include an XSD file that can be used to validate information in the XML file. The XSD file may include schema transforms that validate and enforce conformity with one or more schema rules. For non-compliant configuration data, the system may generate a report that an administrator can view to correct misconfiguration. The XSD may also include a string to show for non-compliant configuration data that the system places in the report.

In some embodiments, the configuration management system allows models or sub-models to include aggregate rules that span information collected in two different sub-models. For example, an aggregate rule may specify that a SQL backend port should have the same value as a TFS frontend port for the configuration to be correct. The system collects aggregate rule data in a partitioned slot in the result repository in the same manner described for sub-models herein. For example, in a results repository structured as "<context ID>\<model ID>\<sub-model ID>\<machine>," the system may store aggregate values under "<context ID>\discovery.xml."

From the foregoing, it will be appreciated that specific embodiments of the configuration management system have been described herein for purposes of illustration, but that various modifications may be made without deviating from the spirit and scope of the invention. For example, although configuration data has been described herein as one use of the system, the system can also be used to collect and analyze other types of data, such as user information, geographic data, and other distributed data sources. Accordingly, the invention is not limited except as by the appended claims.

What is claimed is:

1. A computer system that collects and manages configuration data, the computer system comprising:
   one or more processors; and
   one or more computer-readable hardware storage devices having stored thereon computer-executable instructions, the computer-executable instructions being executable by the one or more processors to cause the computer system to:
      generate a main configuration data model for a system, the main configuration data model at least describing what configuration information to collect from the system and how to format the configuration information for storage and analysis;
      partition the main configuration data model into one or more logical sub-models, the one or more logical sub-models being included in a hierarchy beneath the main configuration data model, wherein each of the one or more logical sub-models describes how to collect a sub-portion of the configuration information such that as a whole, a combination of all of the one or more sub-models describes how to collect all of the configuration information, and wherein a corresponding separate thread of each one of the one or more logical sub-models is directed to collect a corresponding sub-portion of the configuration information such that the separate threads collect their corresponding data in parallel with one another;
      using the one or more logical sub-models, collect the configuration information from the system; and
      compare the collected configuration information to a recommended configuration setting to identify one or more differences between the collected configuration information and the recommended configuration setting.

2. The computer system of claim 1, wherein execution of the computer-executable instructions further causes the computer system to:
   combine at least two different logical sub-models to create a new logical model.

3. The computer system of claim 1, wherein execution of the computer-executable instructions further causes the computer system to:
   share at least two logical sub-models with one or more different logical sub-models to create a new logical model.

4. The computer system of claim 1, wherein the system is an enterprise server computer system.

5. The computer system of claim 1, wherein execution of the computer-executable instructions further causes the computer system to:
   identify that a portion of the configuration data is to be updated;
   identify a particular logical sub-model that corresponds with the portion of the configuration data that is to be updated;
   update the portion of the configuration data; and
   after the update, update only the particular logical sub-model that corresponds with the updated portion of the configuration data while refraining from updating any remaining logical sub-models.

6. The computer system of claim 1, wherein partitioning the main configuration data model into the one or more logical sub-models is performed at least partially by partitioning the main configuration data model according to machine.

7. A method implemented by one or more processors of a computer system to collect and manage configuration data, the method comprising:
   generating a main configuration data model for an enterprise computer system, the main configuration data model at least describing what configuration information to collect from the enterprise computer system and how to format the configuration information for storage and analysis;
   partitioning the main configuration data model into one or more logical sub-models, the one or more logical sub-models being included in a hierarchy beneath the main configuration data model, wherein each of the one or more logical sub-models describes how to collect a sub-portion of the configuration information such that as a whole, a combination of all of the one or more sub-models describes how to collect all of the configuration information, and wherein a corresponding separate thread of each one of the one or more logical sub-models is directed to collect a corresponding sub-portion of the configuration information such that the separate threads collect their corresponding data in parallel with one another;
   using the one or more logical sub-models, collecting the configuration information from the enterprise computer system; and
   sending the collected configuration information to an outside service for analysis to detect an existence of any errors.

8. The method of claim 7, wherein a partitioned configuration result store is created for at least one logical sub-model.

9. The method of claim 8, wherein the partitioned configuration result store is a folder associated with the at least one logical sub-model, the folder including a data file that is associated with the at least one logical sub-model.

10. The method of claim 7, wherein the outside service is a product support service.

11. The method of claim 7, wherein each logical sub-model includes a script to run, which script directs how each logical sub-model is to collect each corresponding sub-portion of the configuration information.

12. The method of claim 7, wherein using the one or more logical sub-models to collect the configuration information from the enterprise computer system is performed in parallel, the parallel performance being conducted by querying which resources are available on the computer system and then determining an amount of work that can be performed by those available resources.

13. The method of claim 7, wherein the main configuration data model is partitioned at least partially based on a source of the configuration information.

14. One or more hardware storage devices having stored thereon computer-executable instructions that are executable by one or more processors of a computer system to cause the computer system to:
 generate a main configuration data model for a system, the main configuration data model at least describing what configuration information to collect from the system and how to format the configuration information for storage and analysis;
 partition the main configuration data model into one or more logical sub-models, the one or more logical sub-models being included in a hierarchy beneath the main configuration data model, wherein each of the one or more logical sub-models describes how to collect a sub-portion of the configuration information such that as a whole, a combination of all of the one or more sub-models describes how to collect all of the configuration information, and wherein a corresponding separate thread of each one of the one or more logical sub-models is directed to collect a corresponding sub-portion of the configuration information such that the separate threads collect their corresponding data in parallel with one another;
 using the one or more logical sub-models, collect the configuration information from the system;
 compare the collected configuration information to a declarative representation of a recommended configuration setting to identify one or more differences between the collected configuration information and the declarative representation of the recommended configuration setting; and
 display the one or more differences between the collected configuration information and the declarative representation of the recommended configuration setting on a user interface of the computer system for viewing by an administrator.

15. The one or more hardware storage devices of claim 14, wherein execution of the computer-executable instructions further causes the computer system to:
 provide automated remediation or assisted remediation services to the administrator to resolve the one or more differences between the collected configuration information and the declarative representation of the recommended configuration setting.

16. The one or more hardware storage devices of claim 15, wherein the automated remediation or assisted remediation services includes providing a prompt on the user interface to the administrator to select a fix for a particular configuration difference.

17. The one or more hardware storage devices of claim 14, wherein execution of the computer-executable instructions further causes the computer system to:
 receive update frequency information for a particular logical sub-model.

18. The one or more hardware storage devices of claim 17, wherein the particular logical sub-model includes metadata that indicates that the particular sub-model is to be updated only at a certain frequency.

19. The one or more hardware storage devices of claim 14, wherein execution of the computer-executable instructions further causes the computer system to:
 validate the collected configuration information using one or more logical sub-model validation rules.

* * * * *